United States Patent
Jia et al.

(10) Patent No.: US 12,349,189 B2
(45) Date of Patent: Jul. 1, 2025

(54) METHOD AND APPARATUS FOR TRANSMITTING INDICATION INFORMATION

(71) Applicant: HUAWEI TECHNOLOGIES CO., LTD., Shenzhen (CN)

(72) Inventors: Qiong Jia, Shanghai (CN); Jun Zhu, Shenzhen (CN); Ji Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 605 days.

(21) Appl. No.: 17/213,593

(22) Filed: Mar. 26, 2021

(65) Prior Publication Data

US 2021/0219341 A1    Jul. 15, 2021

Related U.S. Application Data

(63) Continuation of application No. PCT/CN2019/107714, filed on Sep. 25, 2019.

(30) Foreign Application Priority Data

Sep. 28, 2018  (CN) .......................... 201811142392.X

(51) Int. Cl.
*H04W 74/0808*  (2024.01)
*H04W 72/0446*  (2023.01)

(52) U.S. Cl.
CPC ... *H04W 74/0808* (2013.01); *H04W 72/0446* (2013.01)

(58) Field of Classification Search
CPC ......... H04W 74/0808; H04W 72/0446; H04W 72/20; Y02D 30/70
See application file for complete search history.

(56) References Cited

U.S. PATENT DOCUMENTS 11,297,640 B2 *  4/2022  Oh .................... H04W 16/14
2018/0115347 A1 *  4/2018  Yerramalli ........ H04W 74/0808
(Continued)

FOREIGN PATENT DOCUMENTS

| CN | 105578573 A | 5/2016 |
| CN | 107889114 A | 4/2018 |
| CN | 108600974 A | 9/2018 |

OTHER PUBLICATIONS

Huawei, Hisilicon. "NR numerology and frame structure for unlicensed bands." Gothenburg, Sweden. Aug. 20-Aug. 24, 2018. 3GPP TSG RAN WG1 Meeting #94, R1-1808058. 10 pages.

(Continued)

*Primary Examiner* — Kan Yuen
(74) *Attorney, Agent, or Firm* — Maier & Maier, PLLC

(57) ABSTRACT

Embodiments provide a method for transmitting indication information. The method includes: a first device generates first indication information, where the first indication information includes information about a format of a channel occupancy time of the first device, the channel occupancy time of the first device includes one or more sub-periods, the one or more sub-periods are used for uplink transmission, downlink transmission, flexible transmission, or transmission interruption, and a sub-period for transmission interruption can be used for transmission by another device other than the first device; and the first device sends the first indication information. In an indication manner described in the embodiments, a device may obtain a format in a COT in advance, thereby reducing blind detection overheads, or may sleep in advance, to reducing energy consumption.

19 Claims, 5 Drawing Sheets

(56) References Cited

U.S. PATENT DOCUMENTS

| | | | |
|---|---|---|---|
| 2020/0045738 A1* | 2/2020 | Oh | H04W 72/23 |
| 2020/0053728 A1* | 2/2020 | Huang | H04L 27/26025 |
| 2020/0059963 A1* | 2/2020 | Damnjanovic | H04W 74/0808 |
| 2020/0092861 A1* | 3/2020 | Xu | H04W 74/002 |
| 2020/0092913 A1* | 3/2020 | Xu | H04W 72/0446 |
| 2020/0374933 A1* | 11/2020 | Lou | H04W 74/006 |
| 2020/0383110 A1* | 12/2020 | Kusashima | H04L 5/0037 |
| 2021/0112536 A1* | 4/2021 | Shah | H04L 5/0048 |
| 2021/0160864 A1* | 5/2021 | Lin | H04W 72/23 |
| 2021/0204322 A1* | 7/2021 | Lou | H04W 74/0875 |
| 2021/0212036 A1* | 7/2021 | Wu | H04L 5/0057 |
| 2021/0219341 A1* | 7/2021 | Jia | H04W 72/0446 |
| 2021/0227581 A1* | 7/2021 | Karaki | H04W 72/23 |
| 2021/0282188 A1* | 9/2021 | Cui | H04L 1/1819 |
| 2022/0116152 A1* | 4/2022 | Iyer | H04L 1/188 |

OTHER PUBLICATIONS

Interdigital Inc., "On NR-U Frame Structure", 3GPP TSG RAN WG1 Meeting #94, Gothenburg, Sweden, Aug. 20-24, 2018, R1-1809086, 4 pages.

ZTE, Sanechips, "Discussion on frame structure and scheduling for NR-U", 3GPP TSG RAN WG1 Meeting #92bis, Sanya, China, Apr. 16-20, 2018, R1-1803949, 5 pages.

LG Electronics, "Summary #2 on frame structure for NR-U", 3GPP TSG RAN WG1 Meeting #94, Gothenburg, Sweden, Aug. 20-24, 2018, R1-1809972, 15 pages.

Ericsson, "On AUL Channel Access", 3GPP Draft; R1-1720374, 3rd generation Partnership Project (3GPP, vol. RAN WG1, No. Reno, USA, Nov. 27-Dec. 1, 2017, 8 pages.

* cited by examiner

METHOD AND APPARATUS FOR TRANSMITTING INDICATION INFORMATION

CROSS-REFERENCE TO RELATED APPLICATIONS

This application is a continuation of International Application No. PCT/CN2019/107714, filed on Sep. 25, 2019, which claims priority to Chinese Patent Application No. 201811142392.X, filed on Sep. 28, 2018. The disclosures of the aforementioned applications are hereby incorporated by reference in their entireties.

TECHNICAL FIELD

The embodiments relate to the field of communication technologies, and in particular, to a method and an apparatus for transmitting indication information.

BACKGROUND

The rapid development of wireless communication technologies leads to increasingly shortage of spectrum resources and promotes exploration of unlicensed frequency bands. 3GPP introduces license assisted access (LAA) and enhanced license assisted access (eLAA) technologies. That is, an LTE/LTE-A system is deployed on an unlicensed spectrum in a non-standalone manner, and an unlicensed spectrum resource is maximized with assistance from a licensed spectrum.

A communications system deployed on the unlicensed spectrum usually uses or shares a radio resource in a competitive manner. Generally, before sending a signal, a transmit end first listens whether an unlicensed channel (or an unlicensed spectrum) is idle. For example, the transmit end determines a busy/idle state of the unlicensed spectrum by detecting a power of a received signal on the unlicensed spectrum. If the power of the received signal is less than a specific threshold, it is considered that the unlicensed spectrum is in the idle state. The transmit end may send a signal on the unlicensed spectrum, or otherwise does not send a signal. This mechanism of listening before sending is called listen before talk (LBT).

Currently, there are mainly two types of LBT manners, i.e., CAT4 LBT (also referred to as a type1 channel access procedure) and CAT2 LBT (also referred to as a type2 channel access procedure). For the CAT2 LBT, a device may access a channel after listening that the channel is idle for 25 µs. For the CAT4 LBT, the device needs to access a channel in a random backoff manner. Specifically, the device selects a corresponding random backoff number based on a channel access priority to perform backoff, and accesses the channel after determining that the channel is idle. The device may obtain a corresponding maximum channel occupancy time (MCOT).

When another device needs to perform corresponding transmission based on the MCOT obtained by the device, information about a channel occupancy status at this side and the like needs to be learned.

SUMMARY

Embodiments provide a method for transmitting indication information. In an indication manner described in the embodiments, a device may obtain a format in a channel occupancy time (COT) in advance, to reduce blind detection overheads, or the device may sleep in advance, to reduce energy consumption.

According to a first aspect, an embodiment provides a method for transmitting indication information. The method includes: a first device generates first indication information, where the first indication information includes information about a format of a channel occupancy time of the first device, the channel occupancy time of the first device includes one or more sub-periods, the one or more sub-periods are used for uplink transmission, downlink transmission, flexible transmission, or transmission interruption, and a sub-period for transmission interruption can be used for transmission by another device other than the first device; and the first device sends the first indication information.

The first device may notify the another device of an unscheduled sub-period (or slot) in the COT of the first device by using an indication about transmission interruption in the first indication information, and the another device may not detect corresponding scheduling information, to reduce blind detection overheads, or the another device sleeps in advance, to reduce energy consumption.

In a possible implementation, the method further includes: the first device sends second indication information, where the second indication information is used to update information about the sub-period for transmission interruption.

Optionally, the information about the sub-period for transmission interruption includes a start time point and an end time point of the sub-period for transmission interruption, or an offset of the sub-period for transmission interruption relative to a start time point of the channel occupancy time of the first device and a duration of the sub-period for transmission interruption.

In a possible implementation, the method further includes: the first device sends third indication information, where the third indication information includes end information of the channel occupancy time of the first device.

In a possible implementation, the method further includes: the first device sends fourth indication information, where the fourth indication information includes offset information of an actual channel occupancy time of the first device relative to the channel occupancy time indicated by the first indication information.

Optionally, the offset information includes a time offset of the actual channel occupancy time of the first device relative to the channel occupancy time indicated by the first indication information and/or a transmission type within a duration corresponding to the time offset, and the transmission type includes uplink transmission, downlink transmission, flexible transmission, or transmission interruption.

Optionally, the channel occupancy time of the first device includes one or more sub-period sets, and each sub-period set includes a plurality of sub-periods, where the sub-period for transmission interruption is located between a sub-period for downlink transmission and a sub-period for uplink transmission.

Optionally, the channel occupancy time of the first device is divided into one or more sub-period sets, and the first indication information includes formats of the sub-period sets and a quantity of the sub-period sets.

Optionally, the first indication information includes one of a plurality of indexes corresponding to a plurality of pre-configured channel occupancy time formats.

According to a second aspect, an embodiment provides a method for transmitting indication information. The method includes: a second device receives first indication information from a first device, where the first indication information includes information about a format of a channel occupancy time of the first device, the channel occupancy time of the first device includes one or more sub-periods, the one or more sub-periods are used for uplink transmission, downlink transmission, flexible transmission, or transmission interruption, and a sub-period for transmission interruption can be used for transmission by another device other than the first device; and the second device performs transmission based on the first indication information.

In a possible implementation, the method further includes: the second device receives second indication information, where the second indication information is used to update information about the sub-period for transmission interruption.

Optionally, the information about the sub-period for transmission interruption includes a start time point and an end time point of the sub-period for transmission interruption, or an offset of the sub-period for transmission interruption relative to a start time point of the channel occupancy time of the first device and a duration of the sub-period for transmission interruption.

In a possible implementation, the method further includes: the second device receives third indication information, where the third indication information includes end information of the channel occupancy time of the first device.

In a possible implementation, the method further includes: the second device receives fourth indication information, where the fourth indication information includes offset information of an actual channel occupancy time of the first device relative to the channel occupancy time indicated by the first indication information.

Optionally, the offset information includes a time offset of the actual channel occupancy time of the first device relative to the channel occupancy time indicated by the first indication information and/or a transmission type within a duration corresponding to the time offset, and the transmission type includes uplink transmission, downlink transmission, flexible transmission, or transmission interruption.

Optionally, the channel occupancy time of the first device includes one or more sub-period sets, and each sub-period set includes a plurality of sub-periods, where the sub-period for transmission interruption is located between a sub-period for downlink transmission and a sub-period for uplink transmission.

Optionally, the channel occupancy time of the first device is divided into one or more sub-period sets, and the first indication information includes formats of the sub-period sets and a quantity of the sub-period sets.

Optionally, the first indication information includes one of a plurality of indexes corresponding to a plurality of preconfigured channel occupancy time formats.

According to a third aspect, an apparatus for transmitting indication information is provided. The apparatus includes a module configured to perform the method in the first aspect or any possible implementation of the first aspect, or a module configured to perform the method in the second aspect or any possible implementation of the second aspect.

According to a fourth aspect, a communications apparatus is provided. The communications apparatus may be the first device or the second device (for example, a base station or a terminal) in the foregoing method, or may be a chip disposed in the first device or the second device. The communications apparatus includes: a processor, coupled to a memory, and may be configured to execute an instruction in the memory, to implement the method performed by the first device or the second device in the first aspect and any possible implementation of the first aspect. Optionally, the communications apparatus further includes the memory. Further optionally, the communications apparatus further includes a communications interface, and the processor is coupled to the communications interface.

When the communications apparatus is the first device or the second device, the communications interface may be a transceiver, or, an input/output interface.

When the communications apparatus is the chip disposed in the first device or the second device, the communications interface may be an input/output interface.

Optionally, the transceiver may be a transceiver circuit. Optionally, the input/output interface may be an input/output circuit.

According to a fifth aspect, an embodiment provides a communications system, including: a first device and a second device.

According to a sixth aspect, an embodiment provides a chip, where the chip is connected to a memory, and is configured to read and execute a software program stored in the memory, to implement the method provided in any one of the first aspect and the second aspect or in any implementation of any one of the first aspect and the second aspect.

According to a seventh aspect, an embodiment provides a chip, where the chip includes a processor and a memory, and the processor is configured to read a software program stored in the memory, to implement the method provided in any one of the first aspect and the second aspect or in any implementation of any one of the first aspect and the second aspect.

According to an eighth aspect, an embodiment further provides a computer-readable storage medium, configured to store a computer software instruction used to perform a function of any one of the first aspect to the third aspect or any implementation of any one of the first aspect to the third aspect, and the computer software instruction includes a program designed to perform any one of the first aspect and the second aspect or any implementation of any one of the first aspect and the second aspect.

According to a ninth aspect, an embodiment provides a computer program product including an instruction. When run on a computer, the computer program product enables the computer to perform the method according to the first aspect, or any one of the first aspect and the second aspect, or any implementation of any one of the first aspect and the second aspect.

DETAILED DESCRIPTION OF THE EMBODIMENTS

Embodiments may be applied to a communications system, for example, a wireless communications system. Methods provided in the embodiments may be applied as long as an entity in the communications system needs to indicate or send a channel occupancy time (COT) format. Thus, the communications system includes, but is not limited to, communications systems such as a Long Term Evolution (LTE) system, a Long Term Evolution-advanced (LTE-A) system, a new radio (NR) system, and a 5G ($5^{th}$ generation) system, or may include systems such as a wireless fidelity (Wi-Fi) system, a worldwide interoperability for microwave access (WiMAX) system.

Figure 1:
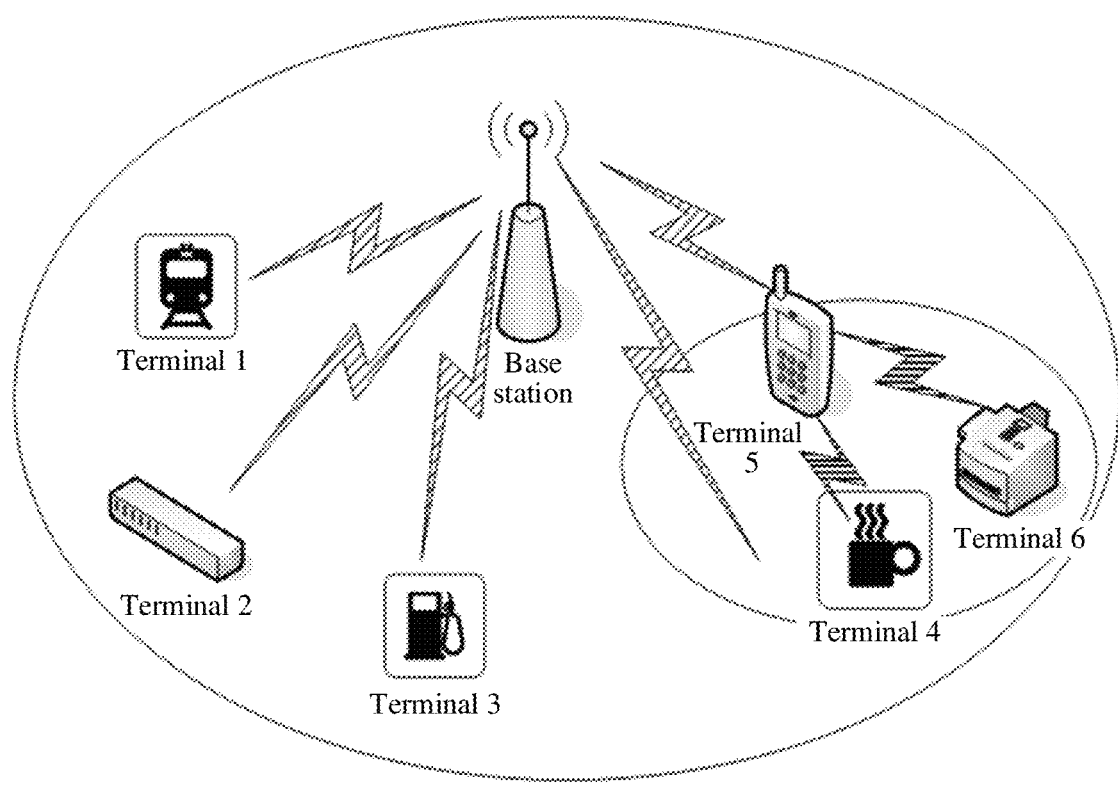
FIG. 1 is a schematic diagram of a communications system.

FIG. 1 is a schematic diagram of a communications system. As shown in FIG. 1, the communications system includes a base station (BS) and a terminal 1 to a terminal 6. In the communications system, the terminal 1 to the terminal 6 may send uplink data to the base station. The base station receives the uplink data sent by the terminal 1 to the terminal 6. In addition, the terminal 4 to the terminal 6 may alternatively form a subsystem communications system. In the communications system, the BS may send downlink data to the terminal 1, the terminal 2, the terminal 5, and the like. The terminal 5 may alternatively send the downlink data to the terminal 4 and the terminal 6. The BS may receive the uplink data of the terminal 1, the terminal 2, the terminal 5, and the like. The terminal 5 may alternatively receive the uplink data of the terminal 4 and the terminal 6.

The base station may be a base station (for example, a Node B or an eNB) in a 2G, 3G, or LTE system, a new radio controller (NR controller), a gNodeB (gNB) in a 5G system, a centralized unit, a new radio base station, a remote radio module, a micro base station, a distributed unit, a transmission reception point (TRP) or a transmission point (TP), or any other wireless access device. This is not limited in this embodiment.

The terminal may be a device having a function of communicating with a base station and a relay node, or may be a device that provides connectivity of voice and/or data for a user. For example, the terminal may be a handheld device or an in-vehicle device having a wireless connection function. A common terminal includes, for example, a mobile phone, a tablet computer, a notebook computer, a palmtop computer, a mobile Internet device (MID), and a wearable device such as a smartwatch, a smart band, or a pedometer. The terminal may alternatively be referred to as user equipment (user equipment, UE).

In an NR system, a radio frame (a duration of the radio frame may be 10 ms) includes a plurality of slots. One slot may include 14 orthogonal frequency division multiplexing (OFDM) symbols. When a subcarrier spacing (Subcarrier Spacing, SCS) is 15 kHz, a duration of one slot is 1 ms. Transmission directions of these OFDM symbols in one slot may be an uplink direction, a downlink direction, and/or a flexible direction. A transmission direction combination of symbols in one slot may be referred to as a format of the slot.

The NR may support to dynamically send a slot format indication ( ). When the NR dynamically sends the slot format indication, the base station indicates the terminal to detect, in the first slot of each detection periodicity, a group common physical downlink control channel (GC-PDCCH), where downlink control information (DCI) carried in the GC-PDCCH is used to indicate a slot format of a slot in the detection periodicity.

In an embodiment, the base station first configures higher level indication information for the terminal, for example, servingCellId, positionInDCI, and slotFormatCombinations. After detecting the GC-PDCCH and obtaining the DCI indicating the SFI, the terminal determines a location of the SFI in the DCI according to the servingCellId and the positionInDCI, so as to determine the SFI. A slot format of a related slot in the detection periodicity is determined based on information indicated by the SFI. For a symbol indicated as D in the slot format, it indicates that the symbol is used for downlink transmission, and the terminal needs to receive corresponding downlink data. For a symbol indicated as U in the slot format, it indicates that the symbol is used for uplink transmission, and the terminal needs to send corresponding uplink data. The uplink data may be one or more of a PUSCH, a PUCCH, a PRACH, an SRS, or the like. For a symbol indicated as F in the slot format, it indicates that the symbol is used for flexible transmission. A symbol used for flexible transmission may be used for uplink transmission or downlink transmission during actual transmission. The terminal needs to further blindly detect the DCI to determine a transmission direction of the symbol.

In the NR system, transmission on an unlicensed frequency band is also supported. In a scenario where a plurality of times of uplink and downlink switching are performed within one COT, an indication of a COT format needs to be designed. The embodiment may be applied to a wireless communications system, as long as that the indication of the COT format needs to be performed in the communications system.

Figure 2:
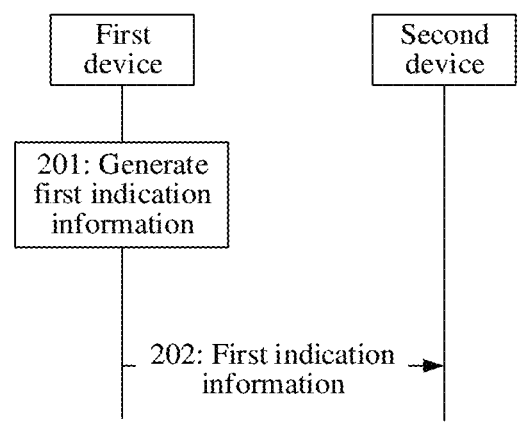
FIG. 2 is a method for transmitting indication information according to an embodiment.

FIG. 2 is a method for transmitting indication information according to an embodiment. The method may indicate a COT format on an unlicensed frequency band. A terminal may learn a transmission format in the COT by using the indication. The method includes the following steps.

Step 201. A first device generates first indication information, where the first indication information includes information about a channel occupancy time format of the first device.

Step 202. Send the first indication information.

After obtaining a COT, a device may share a channel occupancy time of the device with another device. For example, a network device may share a part or all of the channel occupancy time of the network device with a terminal, or a terminal may share a part or all of a channel occupancy time with a network device. Further, the another device may access a channel in a CAT2 LBT manner or directly access a channel without performing LBT to perform transmission, to improve spectrum resource utilization.

Therefore, a period of time in the channel occupancy time of the first device may be shared with another device, or the first device does not perform transmission at a period of time, or transmission of the first device is interrupted at a period of time. This period of time may be referred to as a sub-period for transmission interruption (or a sub-period for shared transmission).

In an embodiment, the channel occupancy time of the first device may include at least one sub-period set. One sub-period set includes one or more sub-periods. One sub-period may be used for uplink transmission, downlink transmission, flexible transmission, or transmission interruption. A sub-period for transmission interruption can be used for transmission by another device other than the first device. For example, the another device may perform the uplink transmission or the downlink transmission in the sub-period. Alternatively, the first device does not perform transmission in the sub-period for transmission interruption.

The first device may notify the another device of an unscheduled sub-period (or slot) in the COT of the first device by using an indication about transmission interruption in the first indication information, and the another device may not detect corresponding scheduling information, to reduce blind detection overheads, or the another device sleeps in advance, to reduce energy consumption.

Further, one COT may include one or more sub-period sets. For a case in which one COT includes a plurality of sub-period sets, there is one uplink-downlink switching between the two sub-period sets. The uplink-downlink switching refers to switching from uplink transmission to downlink transmission or switching from downlink transmission to uplink transmission. For example, the last sub-period in a sub-period set is used for the downlink transmission, and the first sub-period in a next sub-period set adjacent to the sub-period set is used for the uplink transmission. There is uplink-downlink switching between the two sub-period sets. It should be noted that, in one sub-period set, there may alternatively be one or more uplink-downlink switching. This is determined by a format of the sub-period set.

One sub-period set may include a sub-period for downlink transmission and/or a sub-period for uplink transmission. After the sub-period for the downlink transmission, or before the sub-period for the uplink transmission, or between the sub-period for the downlink transmission and the sub-period for the uplink transmission, there is a duration for transmission interruption and/or flexible transmission.

FIG. 3a to FIG. 3e are, respectively, schematic diagrams of a format of COT. As shown in FIG. 3a to FIG. 3e, one COT includes two sub-period sets. There is one uplink-downlink switching between the two sub-period sets. Each sub-period set may include one or more of a sub-period for downlink transmission D, a sub-period for uplink transmission U, a sub-period for flexible transmission F (which may alternatively be represented by X in some implementations), and a sub-period for transmission interruption P. It may be understood that the transmission interruption P is located between two segments of transmission, that is, neither located in a start sub-period of the COT, nor located in an end sub-period of the COT. For example, a sub-period set 1 in FIG. 3a sequentially includes a sub-period for downlink transmission D, a sub-period for flexible transmission F, a sub-period for transmission interruption P, and a sub-period for uplink transmission U. A format of the sub-period set 1 may be represented as D+F+P+U. Further, a format of a sub-period set may be one of D+F+P+U, D+P+F+U, D+F+P+F+U, D+F+U, D+P+U, or the like. Further, an order of each sub-period in a sub-period set may be adjusted. For example, sequences of P and F in the sub-period set 1 in FIG. 3b may be exchanged. In addition, a duration of each sub-period may be the same or may be different.

FIG. 3a to FIG. 3e are examples, which do not limit a quantity of sub-period sets in one COT, and do not limit a combination manner of sub-periods in one sub-period set. For example, there may be three, four or more sub-period sets in one COT. A sub-period set may alternatively only include a sub-period for downlink transmission and a sub-period for transmission interruption.

Further, a format of the sub-period set includes at least one of a transmission type (for example, the sub-period is used for uplink transmission, downlink transmission, flexible transmission, or major transmission) of each sub-period in the sub-period set, the duration of each sub-period, and the order of each sub-period. Therefore, the transmission types, durations, and/or orders of the sub-periods in one sub-period set may be preconfigured, or may be dynamically indicated by using signaling.

Further, the format of the sub-period set in one COT may be preconfigured. The format of the sub-period set may be one of a plurality of preconfigured formats. Index values may be set for the plurality of formats separately. The first indication information includes an index value corresponding to each sub-period set in the COT. For example, Table 1 shows index values corresponding to the preconfigured formats of the plurality of sub-period sets. The first device can notify the information about the COT format of the first device to another device by sending the first indication information carrying the index value.

TABLE 1

Format Table of Sub-period Set

| Index value | Format of sub-period set |
| --- | --- |
| 1 | D + F + P + U |
| 2 | D + P + F + U |
| 3 | D + F + P + F + U |
| 4 | D + P + U |
| ... | ... |

In an embodiment, the format of the sub-period set in one COT may alternatively be dynamically indicated by using signaling. The first device carries the first indication information in control signaling for sending. The control signaling may be DCI or radio resource control (RRC) signaling. The control signaling carrying the first indication information includes one or more fields, and one field is used to indicate a format of one sub-period set. A quantity of sub-period sets in one COT corresponds to a quantity of sub-fields in the first indication information (or corresponding control signaling). Further, a quantity of sub-period sets included in the COT may be preset, or may be configured by using signaling. For example, the quantity of sub-period sets included in the COT is configured by using RRC signaling. The format of the sub-period set and the quantity M of sub-period sets in the COT are configured by using the control signaling. M is an integer greater than or equal to 1. After receiving these pieces of information, the second device repeats the information for M times based on the format of the sub-period set, to obtain the format of the entire COT.

Optionally, the first indication information further includes information about a quantity of sub-period sets. The information about the quantity of sub-period sets may be related to a maximum quantity of times of uplink-downlink switching supported in one COT. In some scenarios, the first indication information includes a maximum quantity of times of uplink-downlink switching supported in one COT. For example, if one COT supports a maximum of three times of uplink-downlink switching, and in the case that there is one time of uplink-downlink switching in one sub-period set, one COT may include two sub-period sets. For example, the first indication information (or the control signaling carrying the first indication information) used to indicate the COT format includes one or more of the following fields:

field 1: quantity N of sub-period sets
field 2: sub-period set indication {sub-period set indication 0, sub-period set indication 1, . . . , sub-period set indication (N−1)}
field 3: reference subcarrier space It should be noted that in NR, waveform-related parameters such as a subcarrier space and a CP length are referred to as numerology. The embodiment mainly relates to the subcarrier space. In different numerology scenarios, the duration of the sub-period indicated in the first indication information is related to the subcarrier space. For example, if a sub-period for downlink transmission indicated in the DCI is 1 ms, and a reference subcarrier space is 15 kHz, the sub-period corresponds to one slot. If a sub-period for downlink transmission indicated in the DCI is 1 ms, and a reference subcarrier space is 60 kHz, the sub-period corresponds to four slots.

Figure 3A:
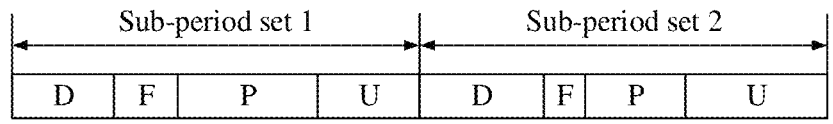
FIG. 3a is a schematic diagram of a format of a COT.
Figure 3B:
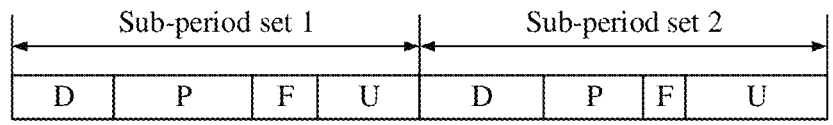
FIG. 3b is a schematic diagram of a format of a COT.
Figure 3C:
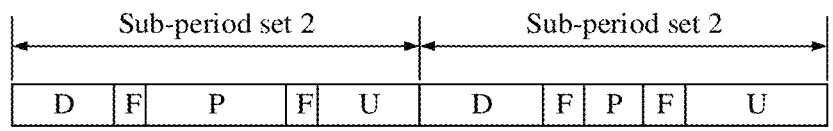
FIG. 3c is a schematic diagram of a format of a COT.
Figure 3D:
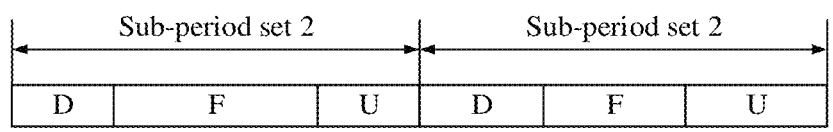
FIG. 3d is a schematic diagram of a format of a COT.
Figure 3E:
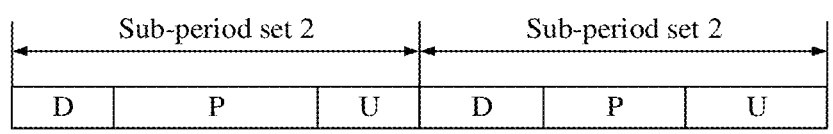
FIG. 3e is a schematic diagram of a format of a COT.
Figure 3F:
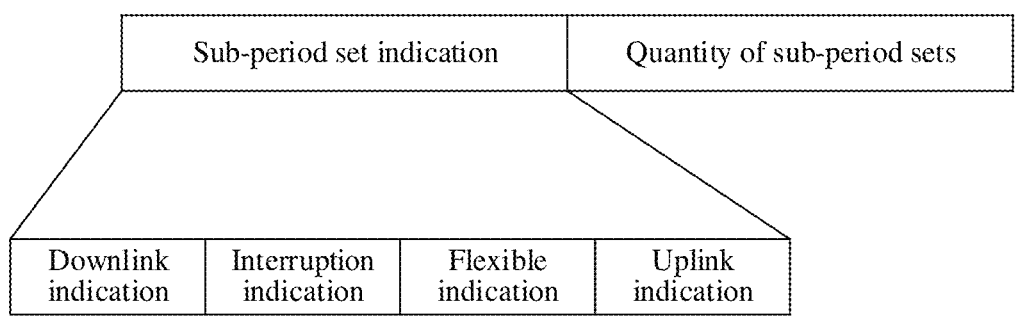
FIG. 3f is a schematic diagram of control signaling that carries first indication information.
Figure 3G:
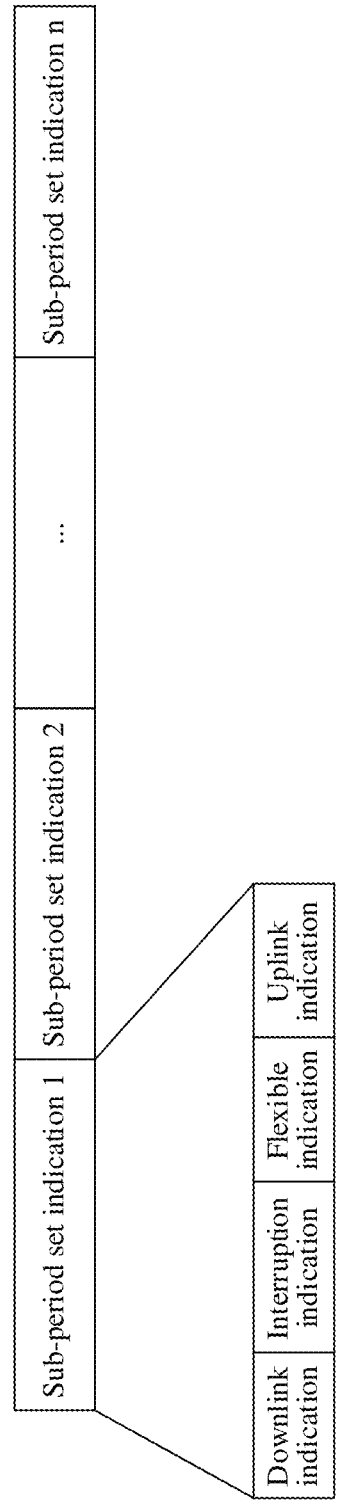
FIG. 3g is a schematic diagram of control signaling that carries first indication information.

For example, the COT format of the first device may be broadcast by using the control signaling carrying the first indication information in two manners as shown in FIG. 3f and FIG. 3g.

FIG. 3f is a schematic diagram of control signaling that carries first indication information. As shown in FIG. 3f, the first indication information includes a sub-period set indication 1, a sub-period set indication 2, . . . , and a sub-period set indication n. One sub-period set indication corresponds to one sub-period set. One sub-period set indication includes at least one of a downlink indication, an interruption indication, a flexible indication, and an uplink indication. Each indication respectively corresponds to a sub-period. The downlink indication is used to indicate that the corresponding sub-period thereof is used for the downlink transmission, and/or indicate a duration of the sub-period. The interruption indication is used to indicate that the corresponding sub-period thereof is used for transmission interruption, and/or indicate a duration of the sub-period. The flexible indication is used to indicate that the corresponding sub-period thereof is used for the flexible transmission, and/or indicate a duration of the sub-period. The uplink indication is used to indicate that the corresponding sub-period thereof is used for the uplink transmission, and/or indicate a duration of the sub-period. Orders of these indications in the sub-period set indication may be consistent with orders of the sub-periods that correspond to the indications and that are in the sub-period set.

FIG. 3g is a schematic diagram of control signaling that carries first indication information. As shown in FIG. 3g, the first indication information includes a sub-period set indication and a quantity of sub-period sets. After receiving the control signaling, the second device repeats a format of the sub-period set corresponding to the sub-period set indication based on the quantity of sub-period sets, to obtain a format of an entire COT.

Optionally, one sub-period set indication includes a downlink indication, an interruption indication, a flexible indication, and an uplink indication. When the sub-period set does not include a sub-period for uplink transmission or flexible transmission, the uplink indication or the flexible indication in the corresponding sub-period set indication may be set to a reserved value (for example, 0).

Optionally, the first indication information may include an absolute duration of the sub-period. The absolute duration may be indicated in a unit of symbol/slot/mini-slot/sub-frame/frame, or may be in a unit of ms/m/min. FIG. 3a is used as an example, indication information of the sub-period set 1 in the COT may include: a quantity of slots x1+a quantity of symbols x2 that correspond to the sub-period for downlink transmission, a quantity of slots y1+a quantity of symbols y2 that correspond to the sub-period for uplink transmission, a quantity of slots z1+a quantity of symbols z2 that correspond to the sub-period for flexible transmission, and a quantity of slots m1+a quantity of symbols m2 that correspond to the sub-period for transmission interruption. Alternatively, indication information of the sub-period set 1 in the COT may include: a total quantity of slots t1+a total quantity of symbols t2 that correspond to the sub-period set 1, a quantity of slots x1+a quantity of symbols x2 that correspond to the sub-period for downlink transmission, a quantity of slots y1+a quantity of symbols y2 that correspond to the sub-period for uplink transmission, and a quantity of slots z1+a quantity of symbols z2 that correspond to the sub-period for flexible transmission. A duration of the sub-period for transmission interruption may be obtained by subtracting durations of the other three sub-periods from a total duration of the sub-period set 1. Further, a duration value of each sub-period may be 0. In other words, the sub-period for the uplink transmission or the flexible transmission may not be included, or the sub-period for the downlink transmission or the transmission interruption may not be included.

Optionally, the first indication information may be carried by using a GC-PDCCH. For example, the first indication information may be carried by redefining/reinterpreting DCI, for example, a DCI format 2_0 in an NR system. Alternatively, the first indication information may be carried by newly-added DCI.

The embodiment is applicable to a case in which a base station successfully obtains a channel through contention by using CAT4 LBT and obtains a corresponding MCOT, and is also applicable to a case in which UE successfully obtains a channel through contention by using CAT4 LBT and obtains a corresponding MCOT. For example, the base station carries a format of each sub-period set in control signaling for indication. The control signaling may be DCI information and/or RRC signaling. Another device (the UE or the base station) in a cell in which the base station is located may learn the COT format by using the control signaling.

According to the indication manner described in the embodiment, the device may obtain a format in the COT in advance, so that for an unscheduled device or some devices, blind detection may not be performed in an unscheduled slot. In this way, blind detection overheads can be reduced, or the device sleeps in advance, to reduce energy consumption. In addition, a channel that is no longer occupied is released by indicating transmission interruption in the COT, so that another device can access the channel in the time period, to improve spectrum resource utilization.

Embodiment 1

During transmission, a COT structure may change due to data arrival or scheduling policy adjustment. The COT format may be updated by sending new indication information based on the foregoing indication manner.

Further, a sub-period for transmission interruption in the COT may be indicated or updated. Indication of downlink transmission, uplink transmission, and flexible transmission in the COT may be indicated in the foregoing described manner, or may be indicated in another manner, for example, an SFI indication manner. By using the foregoing manner, format indication may be performed on each sub-period set in the COT, that is, indication of an entire format of the COT may be completed.

In a possible implementation, a first device sends second indication information. The second indication information is used for the COT format. Alternatively, the second indication information is used to update a format of a sub-period set including a sub-period for transmission interruption. The second indication information includes latest information about the sub-period for transmission interruption. The first device may further learn or update information about transmission interruption on the basis of already learning the information about downlink transmission, uplink transmission, and flexible transmission in the COT. The first device may notify another device of the latest COT format of the first device by using the second indication information. For example, the second device receives indication information of two COT formats one after another. If the COT format indicated by the indication information received later is different from the COT format indicated by the previous indication information, the COT format received later is prevailing.

The second indication information may be carried in the DCI or another control signaling. Optionally, a new field is added to the DCI, or new DCI is designed to indicate to update information about the transmission interruption.

For example, an absolute time location of the sub-period for transmission interruption may be indicated, for example, a combination of one or more of a start period, an interruption duration, and an end period of the transmission interruption. The time information of the start period, the interruption duration, and the end period may be in a unit of symbol/slot/mini-slot/subframe/frame, or may be in a unit of ms/m/min.

Optionally, the information about transmission interruption is time offset information based on a specific time point. The time point may be a start time point/end time point of the COT, a start time point/end time point of a segment of downlink transmission in the COT, or a start time point/end time point of a segment of flexible transmission in the COT, or a start time point/end time point of a segment of uplink transmission in the COT. For example, the information about transmission interruption may include a period of duration d after offsetting by a time offset $t_{offset}$ relative to a specific time point T. That is, the second indication information needs to include one or more combinations of T, $t_{offset}$, and d. The $t_{offset}$ and d may be in a unit of symbol/slot/mini-slot/subframe/frame, or may be in a unit of ms/m/min.

By adding the new field to the DCI or designing the new DCI, the transmission interruption in the COT is indicated.

Embodiment 2

This embodiment provides a COT format indication manner. In this embodiment, the COT format is implemented in an SFI indication manner, and in particular, the indication of the sub-period for transmission interruption. The SFI indication manner shown in Table 2 is used as an example to describe how to indicate the COT format in a similar manner.

TABLE 2

SFI Indication Manner Table

| Format | Serial number of symbol | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | F | F | F | F |
| 6 | D | D | D | D | D | D | D | D | D | F | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | F | F | F | F | U |
| 31 | D | D | D | D | D | D | D | D | D | D | F | U | U | U |
| 32 | D | D | D | D | D | D | D | D | D | F | F | U | U | U |
| 33 | D | D | D | D | D | D | D | F | F | F | F | U | U | U |
| 34 | D | F | U | U | U | U | U | U | U | U | U | U | U | U |

TABLE 2-continued

SFI Indication Manner Table

| Format | Serial number of symbol | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | F | F | U | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | F | F | U | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | F | F | F | F | F | U |
| 54 | F | F | F | F | IF | F | F | D | D | D | D | D | D | D |
| 55 | D | D | F | F | F | U | U | U | D | D | D | D | D | D |
| 56-254 | Reserved | | | | | | | | | | | | | |
| 255 | The terminal determines the slot format based on a specific condition | | | | | | | | | | | | | |

For the reserved formats 56 to 254, a new format may be designed, including D, U, F, and P, which respectively represent downlink transmission, uplink transmission, flexible transmission, and transmission interruption. For example, the format 56 may be defined as being used for implementation of transmission interruption. That is, all the symbols corresponding to the format 56 are P. The formats 56, 57, and 58 may be defined as shown in Table 3. It should be understood that Table 3 is merely used for solution description, and does not constitute a limitation.

TABLE 3

SFI Indication Manner Table of Formats 56, 57, and 58

| 56 | P | P | P | P | P | P | P | P | P | P | P | P | P | P |
| 57 | F | F | F | F | F | F | F | P | P | P | P | P | P | P |
| 58 | D | D | P | P | P | U | U | U | D | D | D | D | D | D |
| ... | | | | | | | | | | | | | | |

In a possible implementation, flexible transmission in Table 2 may be adjusted to transmission interruption. For example, a field may be used to indicate that a symbol F in the predefined Table 2 is adjusted to P. The field may be a new field added to the control signaling such as the RRC signaling or DCI, or another field may be reused. The field may be a part of the first indication information. The first device may send the field to the second device in a broadcast manner, for example, adding an interruption indication field to the DCI. The field is of 1 bit. If the field is of a first value (for example, "1"), it indicates that the symbol indicating F in Table 2 is used for transmission interruption. If the field is of a second value (for example, "0"), it indicates that the symbol indicating F in Table 2 is used for flexible transmission. It is assumed that a format corresponding to a specific slot is indicated by the SFI as the format 2 in Table 2. If the interruption indication field is set to 1, it indicates that all the symbols in the slot are P, and the slot is used for transmission interruption.

One COT may include one or more slots in Table 2 or Table 3, and each slot may be indicated by a corresponding field. In this way, a plurality of fields may indicate a format of an entire COT. Further, a time unit corresponding to Table 2 or Table 3 may alternatively be replaced with a slot, a mini-slot, or the like. For example, Table 2 or Table 3 indicates not a transmission type of a symbol corresponding to a symbol number, but a transmission type of a slot corresponding to a slot number.

After receiving the field, the second device may learn the COT format of the first device based on the information in Table 1 or Table 2.

The transmission interruption in the COT is indicated by modifying the SFI indication or adding a new indication field.

Embodiment 3

Further, this embodiment provides an indication manner of early end of COT.

In a possible implementation, the first device further sends third indication information. The third indication information includes end information of the channel occupancy time of the first device. For example, a 1-bit field may be newly added to the DCI to indicate that some or all of the COT is released, or an early end of the COT (which may be referred to as a COT end) is indicated in a manner of adding new DCI.

In another possible implementation, the COT is ended in advance by using an update indication of the COT format. In other words, the first device may notify the early end of the COT of the first device to another device by using the second indication information. For example, the second device receives indication information of two COT formats one after another. If COT duration indicated by the indication information received later is smaller than a COT duration indicated by the previous indication information, the COT format received later is prevailing.

By indicating the early end of the COT, a channel use right can be released in time, so that another device can access the channel, to improve resource utilization.

Embodiment 4

In an unlicensed frequency band, due to the uncertainty of an LBT, a moment at which a base station or UE accesses the channel may not be located at a boundary point of a time unit such as a slot, a subframe, or a mini-slot. It is assumed that indication of the COT format is performed based on a time unit such as a complete slot, or a subframe, or a mini-slot. In some possible implementations, indication information of the COT format is prepared before the LBT, and cannot be modified in time after the LBT is completed. Therefore, the indication information of the COT format needs to be further designed.

In a possible implementation, the first device sends fourth indication information. The fourth indication information includes offset information of an actual channel occupancy time of the first device relative to the channel occupancy time indicated by the first indication information. For example, the offset information may be a time offset of a start time point of the actual channel occupancy time of the first device relative to a start time point of the channel occupancy time indicated by the first indication information.

Figure 4:
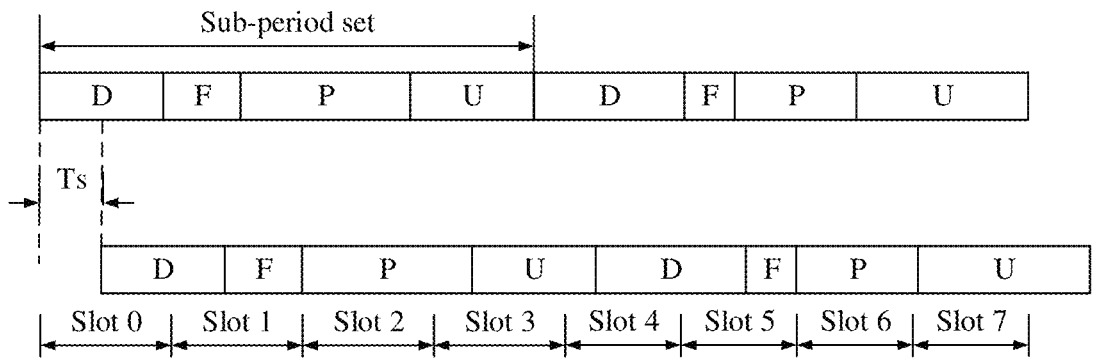
FIG. 4 is a schematic structural diagram of a COT.

FIG. 4 is a schematic structural diagram of a COT. A duration of the COT is set to 8 ms. As shown in FIG. 4, based on the foregoing described solution, the indication information of the COT format has indicated a specific format within the 8 ms COT.

A time point of accessing a channel after the LBT succeeds is set to a first time point. The first time point is at a corresponding moment after offsetting from a start boundary of a time slot 0 by Ts. At this moment, an actual COT duration of the device is 8 ms starting from the first time point. It may be understood that an end moment of the COT is at a corresponding time point after offsetting from a start boundary of a time slot 7 by Ts.

In a possible implementation, the COT format indicated in the COT format is directly offset based on the offset Ts caused by the LBT. That is, all the indicated downlink transmission locations, uplink transmission locations, flexible direction transmission locations, and transmission interruption locations are offset by Ts.

Figure 5:
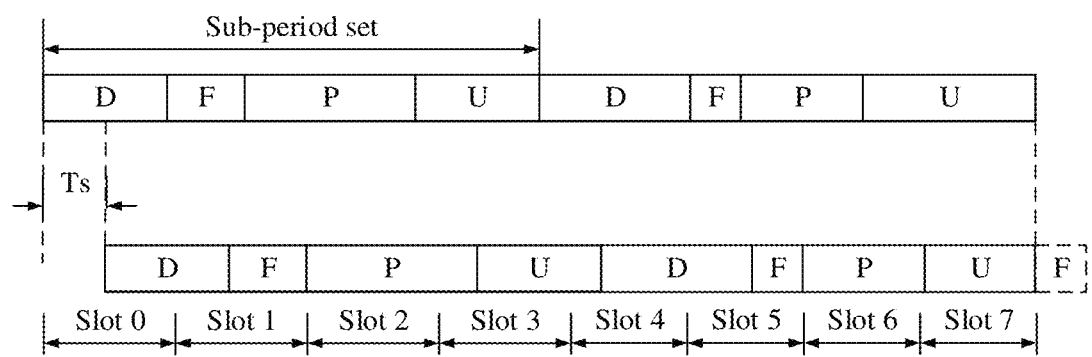
FIG. 5 is a schematic structural diagram of a COT.

In another possible implementation, for a start slot indicated by the COT format, transmission in a time unit corresponding to the offset caused by the LBT is discarded, or knocked out. Formats in the remaining complete slots still follow up a format indicated by the COT format indication information. FIG. 5 is a schematic structural diagram of a COT. As shown in FIG. 5, a part corresponding to the offset Ts caused by the LBT is directly discarded or knocked out. Optionally, a time unit corresponding to the offset Ts may be added to a tail of the COT.

A transmission format in a time unit (which may be referred to as an extension period) corresponding to the offset at the tail is indicated according to a preset rule. For example, a transmission type in the extension period is one of D, U, F, and P by default, or is the same as a transmission type of a symbol adjacent to the extension period in the COT by default. Optionally, some fixed formats are set for extension periods of different durations. For example, when the duration of the extension period is one symbol, a transmission format corresponding to the extension period is one of D, U, F, and P; and when the duration of the extension period is greater than one symbol, a transmission format corresponding to the transmission format is one or more combinations of D, U, F, and P.

Optionally, a dynamic indication manner may alternatively be used for transmission format in the extension period. For example, the fourth indication information may include information used to indicate the format of the extension period. Alternatively, new COT format indication information (for example, the first indication information) is sent to indicate the format of the extension period. Thus, the first indication information or the fourth indication information may include duration information corresponding to one or more of D, U, F, and P corresponding to the extension period. Alternatively, some extension period modes are predefined, and new COT indication information is used to indicate mode information of the extension period. The extension period mode may be defined in a standard in a table manner. For example, in Table 4.

TABLE 4

Extension Period Mode Table

| Mode index | Quantity of symbols | Format of extension period |
| --- | --- | --- |
| 1 | 1 | F |
| 2 | 1 | D |
| 3 | 1 | U |
| 4 | 1 | P |
| 5 | 2 | D |
| 6 | 2 | D |
| 7 | 2 | P |
| ... | ... | ... |

The first device may send the fourth indication information carrying the mode index to the second device. The second device receives the fourth indication information. The format of the extension period corresponding to the mode index in the fourth indication information may be learned by looking up the table.

In this embodiment, when the COT starts and ends in the extension period due to the LBT, the indication of the COT format is implemented.

The method for transmitting data according to the embodiments is described above in detail with reference to FIG. 1 to FIG. 5. Based on a same concept, an apparatus for transmitting data according to the embodiments is described below with reference to FIG. 6 to FIG. 8. It should be understood that the features described in the method embodiments are also applicable to the following apparatus embodiments.

Figure 6:
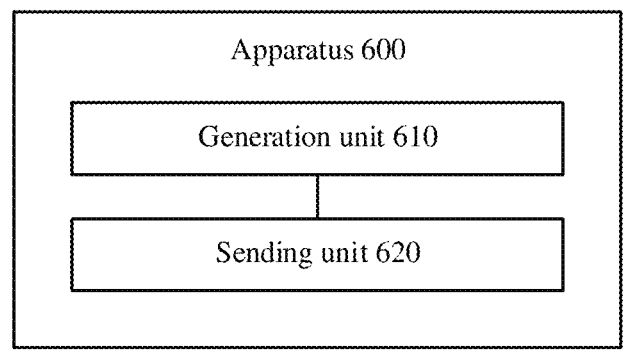
FIG. 6 is a schematic block diagram of an apparatus for transmitting indication information according to an embodiment.

FIG. 6 is a schematic block diagram of an apparatus 600 for transmitting indication information according to an embodiment. The apparatus 600 is configured to perform the method performed by the first device in the foregoing method embodiments. Optionally, a specific form of the apparatus 600 may be a base station, a chip in a base station, a terminal, or a chip in a terminal. This is not limited in this embodiment. The apparatus 600 includes the following several modules.

A generation module 610 is configured to generate first indication information, where the first indication information includes information about a format of a channel occupancy time of the first device, the channel occupancy time of the first device includes one or more sub-periods, the one or more sub-periods are used for uplink transmission, downlink transmission, flexible transmission, or transmission interruption, and a sub-period for transmission interruption can be used for transmission by another device other than the first device.

A sending module 620 is configured to send the first indication information.

In a possible implementation, the sending module 620 is further configured to send second indication information, where the second indication information is used to update information about the sub-period for transmission interruption.

Optionally, the information about the sub-period for transmission interruption includes a start time point and an end time point of the sub-period for transmission interruption, or an offset of the sub-period for transmission interruption relative to a start time point of the channel occupancy time of the first device and a duration of the sub-period for transmission interruption.

In a possible implementation, the sending module 620 is further configured to send third indication information, where the third indication information includes end information of the channel occupancy time of the first device.

In a possible implementation, the sending module 620 is further configured to send fourth indication information, where the fourth indication information includes offset information of an actual channel occupancy time of the first device relative to the channel occupancy time indicated by the first indication information.

Optionally, the offset information includes a time offset of the actual channel occupancy time of the first device relative to the channel occupancy time indicated by the first indication information and/or a transmission type within a duration corresponding to the time offset, and the transmission type includes uplink transmission, downlink transmission, flexible transmission, or transmission interruption.

Optionally, the channel occupancy time of the first device includes one or more sub-period sets, and each sub-period set includes a plurality of sub-periods, where the sub-period for transmission interruption is located between a sub-period for downlink transmission and a sub-period for uplink transmission.

Optionally, the channel occupancy time of the first device is divided into one or more sub-period sets, and the first indication information includes formats of the sub-period sets and a quantity of the sub-period sets.

Optionally, the first indication information includes one of a plurality of indexes corresponding to a plurality of preconfigured channel occupancy time formats.

Further, the apparatus 600 may include a processing module or a receiving module. The receiving module is configured to receive data, and the processing module is configured to process the received data and process to-be-sent data.

Figure 7:
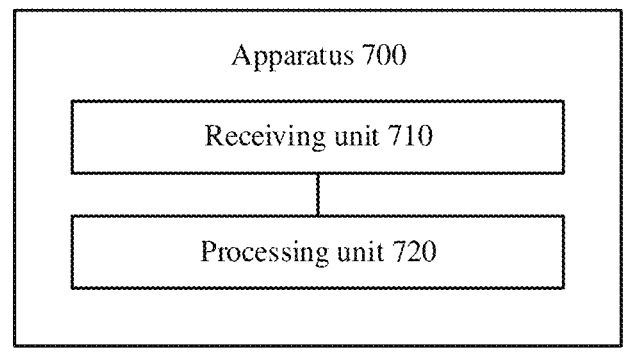
FIG. 7 is a schematic block diagram of an apparatus for transmitting indication information according to an embodiment.

FIG. 7 is a schematic block diagram of an apparatus 700 for transmitting indication information according to an embodiment. The apparatus 700 is configured to perform the method performed by the second device in the foregoing method embodiments. Optionally, a specific form of the apparatus 700 may be a base station, a chip in a base station, a terminal, or a chip in a terminal. This is not limited in this embodiment. The apparatus 700 includes the following several modules.

A receiving module 710 is configured to receive first indication information from a first device, where the first indication information includes information about a format of a channel occupancy time of the first device, the channel occupancy time of the first device includes one or more sub-periods, the one or more sub-periods are used for uplink transmission, downlink transmission, flexible transmission, or transmission interruption, and a sub-period for transmission interruption can be used for transmission by another device other than the first device.

A processing module 720 is configured to perform transmission based on the first indication information.

In a possible implementation, the receiving module 710 is further configured to receive second indication information, where the second indication information is used to update information about the sub-period for transmission interruption.

Optionally, the information about the sub-period for transmission interruption includes a start time point and an end time point of the sub-period for transmission interruption, or an offset of the sub-period for transmission interruption relative to a start time point of the channel occupancy time of the first device and a duration of the sub-period for transmission interruption.

In a possible implementation, the receiving module 710 is further configured to receive third indication information, where the third indication information includes end information of the channel occupancy time of the first device.

In a possible implementation, the receiving module 710 is further configured to receive fourth indication information, where the fourth indication information includes offset information of an actual channel occupancy time of the first device relative to the channel occupancy time indicated by the first indication information.

Optionally, the offset information includes a time offset of the actual channel occupancy time of the first device relative to the channel occupancy time indicated by the first indication information and/or a transmission type within a duration corresponding to the time offset, and the transmission type includes uplink transmission, downlink transmission, flexible transmission, or transmission interruption.

Optionally, the channel occupancy time of the first device includes one or more sub-period sets, and each sub-period set includes a plurality of sub-periods, where the sub-period for transmission interruption is located between a sub-period for downlink transmission and a sub-period for uplink transmission.

Optionally, the channel occupancy time of the first device is divided into one or more sub-period sets, and the first indication information includes formats of the sub-period sets and a quantity of the sub-period sets.

Optionally, the first indication information includes one of a plurality of indexes corresponding to a plurality of preconfigured channel occupancy time formats.

Further, the apparatus 700 may include a processing module or a sending module. The processing module is configured to process received data and is configured to process data to be sent, and the sending module is configured to send the data.

Figure 8:
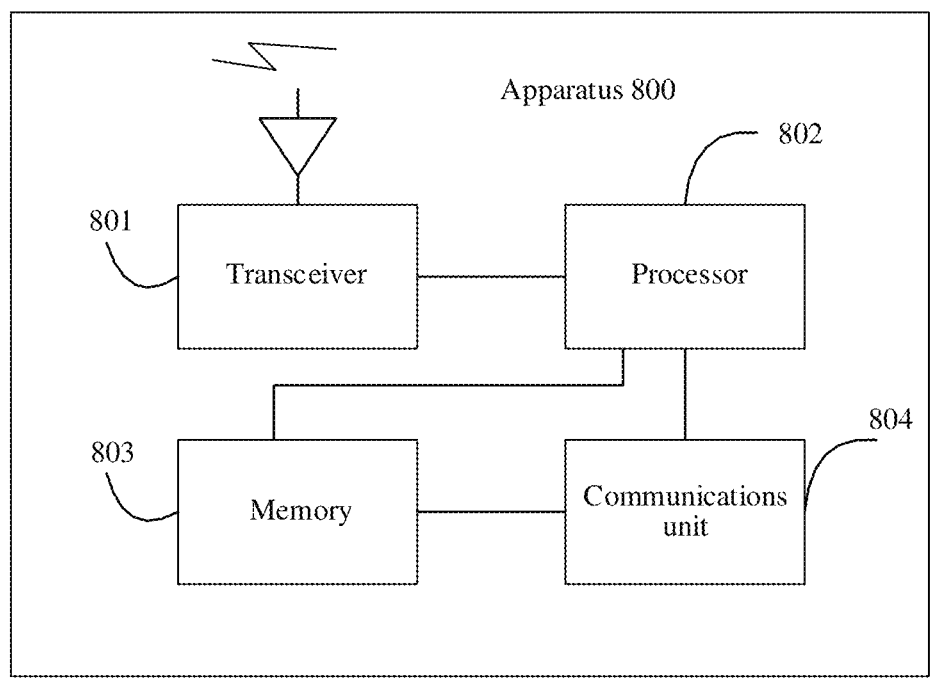
FIG. 8 is a schematic block diagram of a communications apparatus.

Based on a same concept, an embodiment further provides a communications apparatus 800. FIG. 8 is a possible schematic structural diagram of a first device or a second device in the foregoing method embodiments. The apparatus 800 may include a transceiver 801. The transceiver 801 may further include a receiver and a transmitter.

The transceiver 801 is configured to send or receive first indication information, where the first indication information includes information about a format of a channel occupancy time of the first device, the channel occupancy time of the first device includes one or more sub-periods, the one or more sub-periods are used for uplink transmission, downlink transmission, flexible transmission, or transmission interruption, and a sub-period for transmission interruption can be used for transmission by another device other than the first device.

It should be understood that, in some embodiments, the transceiver 801 may be obtained by integrating the transmitter and the receiver. In another embodiment, the transmitter and the receiver may alternatively be independent of each other.

Further, the apparatus 800 may further include a processor 802, a memory 803, and a communications unit 804. The transceiver 801, the processor 802, the memory 803, and the communications unit 804 are connected by using a bus.

On a downlink, to-be-sent data (for example, a PDSCH) or signaling (for example, a PDCCH) is adjusted by the transceiver 801 to output a sample and generate a downlink signal. The downlink signal is transmitted to the terminal in the foregoing embodiments through an antenna. On an uplink, the antenna receives an uplink signal transmitted by the terminal in the foregoing embodiments. The transceiver 801 adjusts the signal received from the antenna, and provides an input sample. In the processor 802, service data and a signaling message are processed. For example, to-be-sent data is modulated and an SC-FDMA symbol is generated. These units perform processing based on a radio access technology (for example, an access technology in LTE, 5G, or another evolved system) used by a radio access network (RAN).

The processor 802 is further configured to control and manage the apparatus 800, to perform processing performed by the first device or the second device in the foregoing method embodiments. For example, the processor 802 is configured to process received information and process to-be-sent information. In an example, the processor 802 is configured to support the apparatus 800 in performing the processing processes of the apparatus 800 in FIG. 2 to FIG. 5. When the processor 802 is used in an unlicensed scenario, the processor 802 further needs to control the apparatus 800 to perform channel listening, to transmit data or signaling. For example, the processor 802 performs channel listening by using a signal received by the transceiver 801 from a transceiver apparatus or the antenna, and controls the signal to be transmitted through the antenna to preempt a channel. In different embodiments, the processor 802 may include one or more processors, for example, include one or more central processing units (CPU). The processor 802 may be integrated into a chip, or may be a chip.

The memory 803 is configured to store a related instruction and data, and program code and data that are of the apparatus 800. In different embodiments, the memory 803 includes, but is not limited to, a random access memory (RAM), a read-only memory (ROM), an erasable programmable read-only memory (EPROM), or a compact disc read-only memory (CD-ROM). In this embodiment, the memory 803 is independent of the processor 802. In another embodiment, the memory 803 may alternatively be integrated into the processor 802.

It should be noted that the apparatus 800 shown in FIG. 8 may be configured to perform the method performed by the first device or the second device in the foregoing method embodiments. For an implementation and an effect of the apparatus 800 shown in FIG. 8 that are not described in detail, refer to related descriptions in the foregoing method embodiments.

It may be understood that FIG. 8 shows only a simplified design of the first device or the second device. In different embodiments, the first device or the second device may include any quantity of transmitters, receivers, processors, memories, and the like, and all first devices or second devices that can implement the embodiments fall within the protection scope.

An embodiment provides a communications system. The communications system includes a first device and a second device. The first device may be the communications apparatus shown in FIG. 6 or the apparatus shown in FIG. 8. The second device may be the communications apparatus shown in FIG. 7 or the apparatus shown in FIG. 8.

Based on a same concept, an embodiment further provides a computer program product. The computer program product includes computer program code. When the computer program code is run on a computer, the computer is enabled to perform the method in the embodiments shown in FIG. 2 to FIG. 5.

Based on a same concept, an embodiment further provides a computer-readable medium. The computer-readable medium stores program code. When the program code is run on a computer, the computer is enabled to perform the method in the embodiments shown in FIG. 2 to FIG. 5.

Based on a same concept, an embodiment further provides a chip. The chip may be a processor, configured to implement the method in the foregoing method embodiments. Further, the chip is connected to a memory, and is configured to read and execute a software program stored in the memory, to implement the method in the embodiments shown in FIG. 2 to FIG. 5.

Based on a same concept, an embodiment provides a chip. The chip includes a processor and a memory. The processor is configured to read a software program stored in the memory, to implement the method in the embodiments shown in FIG. 2 to FIG. 5.

is the embodiments are described with reference to the flowcharts and/or the block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams. These computer program instructions may alternatively be loaded onto a computer or another programmable data processing device, so that a series of operations and steps are performed on the computer or the another programmable device, to generate computer-implemented processing.

It is clear that a person of ordinary skill in the art can make various modifications and variations to the embodiments without departing from the spirit and scope of the embodiments. is the embodiments are intended to cover these modifications and variations.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state disk (SSD)), or the like.

What is claimed is:

1. A method for transmitting indication information, comprising:
    generating, by a first device, first indication information comprising information about a format of a channel occupancy time of the first device, wherein the channel occupancy time of the first device comprises:
    a first sub-period for transmission interruption that is used for transmission by another device other than the first device; and
    one or more other sub-periods used for uplink transmission, downlink transmission, or flexible transmission, the channel occupancy time performs uplink transmission, downlink transmission, or flexible transmission, and the transmission interruption concurrently, and the transmission interruption is located between a sub-period for the downlink transmission and a sub-period for the uplink transmission; and
    sending, by the first device, the first indication information.

2. The method according to claim 1, further comprising:
    sending, by the first device, second indication information, wherein the second indication information is used to update information about the first sub-period for transmission interruption.

3. The method according to claim 2, wherein the information about the first sub-period for transmission interruption comprises a start time point and an end time point of the first sub-period for transmission interruption, or an offset of the first sub-period for transmission interruption relative to a start time point of the channel occupancy time of the first device and a duration of the first sub-period for transmission interruption.

4. The method according to claim 1, further comprising:
    sending, by the first device, third indication information, wherein the third indication information comprises end information of the channel occupancy time of the first device.

5. The method according to claim 1, further comprising:
    sending, by the first device, fourth indication information, wherein the fourth indication information comprises offset information of an actual channel occupancy time of the first device relative to the channel occupancy time indicated by the first indication information.

6. The method according to claim 5, wherein the offset information comprises a time offset of the actual channel occupancy time of the first device relative to the channel occupancy time indicated by the first indication information and/or a transmission type within a duration corresponding to the time offset, and the transmission type comprises uplink transmission, downlink transmission, flexible transmission, or transmission interruption.

7. The method according to claim 1, wherein the channel occupancy time of the first device comprises one or more sub-period sets, and each sub-period set comprises a plurality of sub-periods, wherein the first sub-period for transmission interruption is located between a sub-period for downlink transmission and a sub-period for uplink transmission.

8. The method according to claim 1, wherein the channel occupancy time of the first device is divided into one or more sub-period sets, and the first indication information comprises formats of the sub-period sets and a quantity of the sub-period sets.

9. The method according to claim 1, wherein the first indication information comprises one of a plurality of indexes corresponding to a plurality of preconfigured channel occupancy time formats.

10. A method for transmitting indication information, comprising:
    receiving, by a second device, first indication information from a first device, wherein the first indication information comprises information about a format of a channel occupancy time of the first device, the channel occupancy time of the first device comprises:
    two or more sub-periods used for uplink transmission, downlink transmission, flexible transmission, or transmission interruption, and
    a first sub-period for transmission interruption that is used for transmission by another device other than the first device, the channel occupancy time performs uplink transmission, downlink transmission, or flexible transmission, and the transmission interruption concurrently, and the transmission interruption is located between a sub-period for the downlink transmission and a sub-period for the uplink transmission; and
    performing, by the second device, transmission based on the first indication information.

11. An apparatus for transmitting indication information, comprising:
    a memory configured to store instructions; and
    one or more processors coupled with the memory, wherein the one or more processors are configured to execute the instructions to cause the apparatus to:
    generate first indication information comprising information about a format of a channel occupancy time of a first device, the channel occupancy time of the first device comprises:
    a first sub-period for transmission interruption that is used for transmission by another device other than the first device, and
    two or more other sub-periods used for uplink transmission, downlink transmission, or flexible transmission, the channel occupancy time performs uplink transmission, downlink transmission, or flexible transmission, and the transmission interruption concurrently, and the transmission interruption is located between a sub-period for the downlink transmission and a sub-period for the uplink transmission; and
    send the first indication information.

12. The apparatus according to claim 11, wherein the one or more processors are configured to execute the instructions to cause the apparatus to:
send second indication information, wherein the second indication information is used to update information about the first sub-period for transmission interruption.

13. The apparatus according to claim 12, wherein the information about the first sub-period for transmission interruption comprises a start time point and an end time point of the first sub-period for transmission interruption, or an offset of the sub-period for transmission interruption relative to a start time point of the channel occupancy time of the first device and a duration of the first sub-period for transmission interruption.

14. The apparatus according to claim 11, wherein the one or more processors are configured to execute the instructions to cause the apparatus to:
send third indication information, wherein the third indication information comprises end information of the channel occupancy time of the first device.

15. The apparatus according to claim 11, wherein the one or more processors are configured to execute the instructions to cause the apparatus to:
send fourth indication information, wherein the fourth indication information comprises offset information of an actual channel occupancy time of the first device relative to the channel occupancy time indicated by the first indication information.

16. The apparatus according to claim 15, wherein the offset information comprises a time offset of the actual channel occupancy time of the first device relative to the channel occupancy time indicated by the first indication information and/or a transmission type within a duration corresponding to the time offset, and the transmission type comprises uplink transmission, downlink transmission, flexible transmission, or transmission interruption.

17. The apparatus according to claim 11, wherein the channel occupancy time of the first device comprises one or more sub-period sets, and each sub-period set comprises a plurality of sub-periods, wherein the first sub-period for transmission interruption is located between a sub-period for downlink transmission and a sub-period for uplink transmission.

18. The apparatus according to claim 11, wherein the channel occupancy time of the first device is divided into one or more sub-period sets, and the first indication information comprises formats of the sub-period sets and a quantity of the sub-period sets.

19. The apparatus according to claim 11, wherein the first indication information comprises one of a plurality of indexes corresponding to a plurality of preconfigured channel occupancy time formats.

* * * * *